Sept. 1, 1931.  E. PETERSON  1,821,076
AMPLIFYING SYSTEM
Filed Feb. 28, 1929
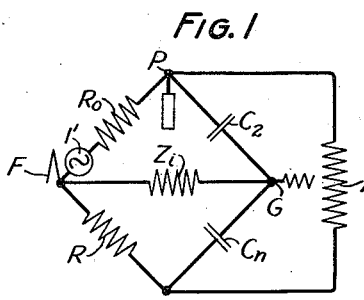
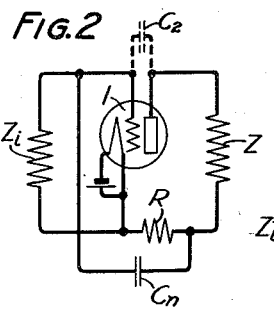
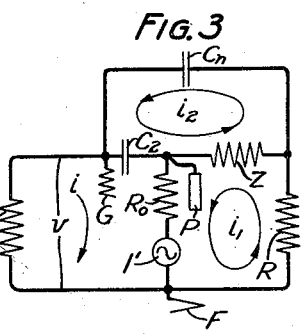
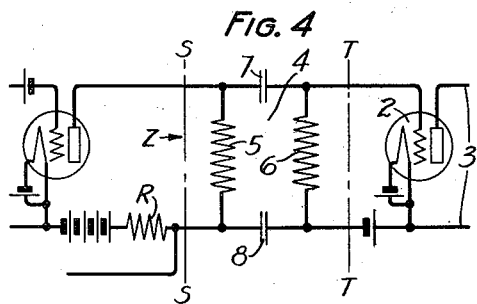
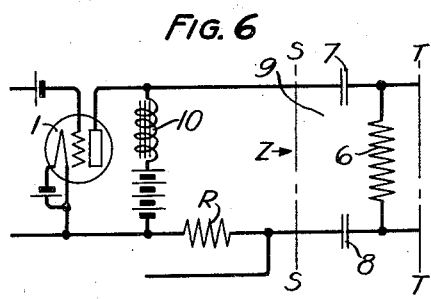
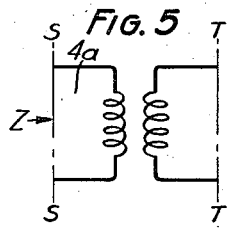
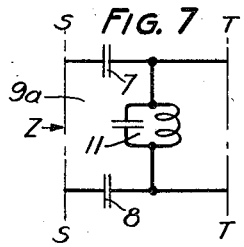
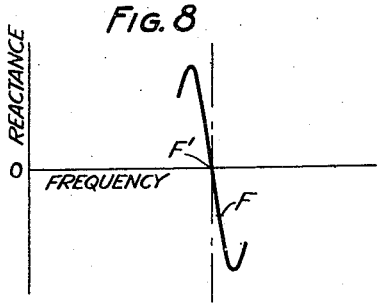
INVENTOR
E. PETERSON
BY *H.A.Burgess*
ATTORNEY Patented Sept. 1, 1931

1,821,076

UNITED STATES PATENT OFFICE

EUGENE PETERSON, OF NEW YORK, N. Y., ASSIGNOR TO BELL TELEPHONE LABORATORIES, INCORPORATED, OF NEW YORK, N. Y., A CORPORATION OF NEW YORK

AMPLIFYING SYSTEM

Application filed February 28, 1929. Serial No. 343,530.

This invention relates to operation of electric space discharge devices, as for example thermionic amplifying devices.

In the circuits of such devices four main paths can be distinguished as input, output, grid and plate circuits, grid and plate circuits referring to the circuits within the discharge tube or device, and input and output referring, respectively, to the input circuit of the stage in which the device is included and the output circuit of that stage.

Interelectrode capacity, particularly plate-grid capacity, couples the output circuit to the input circuit unless the coupling effect of the capacity is neutralized. This coupling renders the input impedance dependent upon the output impedance and further may cause objectionable regeneration or singing in the system as a result of feed-back of electrical variations from the output circuit to the input circuit.

Objects of the invention are to neutralize such objectionable coupling, to render the input impedance independent of the output impedance, and to prevent objectionable regeneration such as that just mentioned.

In one specific aspect, the invention is a Wheatstone bridge having four arms and two diagonals, with the plate-filament space path of a thermionic wave amplifying tube as one arm, the plate-grid capacity in an adjacent arm, and resistance and capacity in the other two arms, respectively, for balancing the space path resistance and the plate-grid capacity. For frequencies at which the reactance of the plate-filament capacity becomes of the order of the space path resistance, the arm opposite that containing the grid-plate capacity may include a capacity corresponding to the plate-filament capacity to take account of the latter capacity in balancing the bridge. The waves to be amplified are applied across the grid and filament, which are at the ends of the input diagonal of the bridge. The load circuit for the amplifier is the other diagonal.

Since the space path resistance of the tube is in one arm of the bridge, variation of plate or filament voltage, or of contact potentials between grid and filament or between plate and filament, tends to unbalance the bridge. Compensation for the plate battery variations can be effected, as for example by using part of the plate battery to provide the grid bias, for instance in the manner disclosed in R. C. Mathes Patent 1,426,754, August 22, 1922. From the opposite viewpoint, variation of the electrode potentials may be used to balance the bridge.

When the circuit departs from the balanced condition, the input impedance may show a negative or positive resistance according to the sign of the load impedance as well as the nature of the circuit unbalance. Advantage can be taken of this property of the system to stabilize the amplitude of the output variations against variation of the amplitude of the input variations. For example, by employing a capacitive load, input variations of greater and smaller amplitude than that for which the plate-filament impedance is of the value at which the bridge is balanced can be made to respectively increase and decrease the plate-filament resistance, and thereby respectively introduce positive and negative resistances in the input impedance, so that the system will accordingly regenerate negatively and positively, respectively, that is, so that variations will be fed back from the output circuit to the input circuit in such phase as to decrease the gain of the amplifier circuit when the input amplitude exceeds a given value and increase the gain when the input amplitude falls below the given value and thus produce volume compression. As is now well known, volume compression is useful, for example, for reducing overload of the transmission circuit and associated apparatus, reduction of amplitude peaks improving the quality of transmission by reducing distortion and avoiding interference. When the volume range of transmission between two points is to be limited by volume compression or contraction at the sending point, the original amplitude relations can be restored by corresponding volume expansion at the receiving point. As explained hereinafter, the amplifier can be given an inductive load, and departure from the balanced condition can then be made to cause volume expansion, instead of volume contraction.

A further object of the invention is to control amplifier gain or to control regeneration in the amplifier in accordance with variations of input amplitude.

Other objects and aspects of the invention will be apparent from the following description and claims.

Figs. 1 to 3 show an amplifier circuit embodying a form of the invention; and Figs. 4 to 8 show by way of example how the load circuit for the amplifier of Figs. 1 to 3 can be made capacitive.

Fig. 1 is a form of Wheatstone bridge circuit that may be used to render the input impedance $Z_i$ of a vacuum tube amplifier stage such as is shown in Fig. 2 independent of the output impedance Z of the stage and so to eliminate singing. $Z_i$ and Z are the grid-filament and load impedances, respectively, of the vacuum tube shown in Fig. 2. The plate, filament and grid of the tube are designated P, F and G. $R_o$ is the resistance of the plate-filament space path, $C_2$ is the grid-plate capacity of the tube, and R and $C_n$ are a resistance and a capacity for balancing the bridge. $Z_i$ and Z form the diagonals of the bridge. The other four arms are $R_o$, $C_2$, R and $C_n$. The condition for balance is $R_o C_2 = C_n R$. The voltage generated in the plate-filament space path is represented in Fig. 1 as a generator 1' connected in the arm $R_o$ of the bridge. When the bridge is balanced, a variation of the output impedance Z cannot affect the current flowing through the input impedance $Z_i$ since those two arms are conjugate, and consequently the circuit is neutralized. Thus, in the condition of balance the bridge circuit is an amplifier circuit in which the grid-plate capacity coupling between the output circuit (of the stage) and the input circuit (of the stage) is neutralized so that passive conjugacy between those circuits results and passive conjugacy between the output circuit (of the stage) and the grid-filament path (within the tube) is obtained. Changes in output impedance (load impedance) do not affect the amount of feed-back from either the output circuit (of the stage) or the plate circuit (within the tube) to the input circuit (of the stage) or to the grid-filament path (within the tube), and do not affect the input impedance (of the stage) or the grid-filament impedance (within the tube). Such a unilateral stage prevents multi-stage regeneration or singing through stages of which it is the first or an intermediate stage.

*Input impedance*

As noted above, when the circuit departs from the balanced condition, the input impedance may show a negative or positive resistance according to the sign of Z as well as the nature of the circuit unbalance. In any case the circuit equations may be written down from Fig. 3:

$$(\mu+1)v = \left(R_o + \frac{1}{jpC_2}\right)i + R_o i_1 + \frac{i_2}{jpC_2}$$
$$\mu v = R_o i + (R + R_o + Z)i_1 - Z i_2 \quad (1)$$
$$0 = \frac{i}{jpC_2} - Z i_1 + i_2\left(Z + \frac{1}{jpC_2} + \frac{1}{jpC_n}\right)$$

The input admittance may be obtained from the solution for $i$ as $$Y = \frac{i}{v} = \frac{Z[Z_p + (\mu+1)Z_n] + [R_o + (\mu+1)R]\left(\frac{1}{jpC_2} + \frac{1}{jpC_n}\right)}{ZZ_p Z_n + \frac{R_o}{jpC_2}Z_n + \frac{RZ_p}{jpC_n}} \quad (2)$$

where $$\left.\begin{array}{l}Z_p = R_o + 1/jpC_2 \\ Z_n = R + 1/jpC_n\end{array}\right\} \quad (3)$$

When $Z_p$ is equal to $kZ_n$ and of the same type, or phase angle, then $$Y = \frac{1 + k + \mu}{kZ_n}$$

which is evidently independent of Z.

*Effect of unbalance on input impedance*

The simplest conditions arise at low frequencies for which the capacity reactances are much greater than the bridge resistances and in (3) the quantities $R_o$ and R may therefore be neglected. Then if the two capacities are equal, $$Y = jpC\left[2 + \frac{\mu(Z + 2R)}{Z + R_o + R}\right]$$

The most interesting case arises when Z is a pure reactance; setting $Z = jR_o$ and $R = k'R_o$ gives $$Y = jpC\left[2 + \mu\frac{2k(1+k')+1)}{(1+k')^2+1}\right]$$
$$-pC\frac{\mu(1-k')}{(1+k')^2+1} \quad (4)$$

Hence when $k' = 1$ at balance, there is no introduced resistance, for $k' > 1$ the resistance is positive, and for $k' < 1$ the resistance is negative. These conclusions were derived on the basis of Z inductive, and it will be found that the sign of the introduced resistance is reversed when Z is capacitive, under the above conditions. As noted above, with capacitive load the amplifier can be operated as a volume compressor or contractor. With inductive load, the amplifier can be operated as a volume expander, since the sign of the introduced resistance is reversed. Further, above, Z was assumed equal to $jR_o$ for simplicity, or in other words, the absolute value of Z was assumed equal to $R_o$; in general $Z=jaR_o$, in which case the conductive term of (4) would read $$g = -pC\frac{\mu(1-k')a}{(1+k')^2+a^2} \quad (5)$$

For any degree of unbalance the maximum of $g$ is found by setting $$\frac{\delta g}{da}=0$$

which gives $1+k=a$. It may be noted that with a pure resistance load it is impossible to unbalance so as to have a negative capacity for the input impedance.

Output impedance

Inasmuch as the output path is conjugate to the grid or input circuit, the output impedance of the circuit may be found from the passive network. Thus at low frequencies, for example, the plate E. M. F. works into $R_o$, R and Z in series, so that for maximum power dissipation in Z when Z is of fixed type or fixed phase angle, $|Z|=R_o+R$.

Fig. 4 indicates one form of capacitive load impedance Z for the amplifier stage comprising the tube 1. This capacitive load is formed by a vacuum tube 2 with its load circuit 3 connected to any desired translating device (not shown) and with the coupling circuit 4 connecting the tubes 1 and 2. The coupling circuit 4 is the circuit included between the dotted lines SS and TT in Fig. 4. It is shown as the usual type of resistance capacity coupling circuit for vacuum tubes, and consists of resistances 5 and 6 and blocking or stopping condensers 7 and 8. Fig. 4 also shows the conventional grid and plate batteries for the tube 1. It is to be understood, of course, that for simplicity the showing in Fig. 2 omits means for supplying D. C. plate and grid potentials and that in practice the circuit of that figure could include such batteries or their equivalents. Also, loss of D. C. potential in R can be avoided by connecting across R a choke coil of high inductance over the frequency range to be transmitted through the amplifier, or by inserting R in circuit by a transformer having high transmission efficiency over said range instead of directly.

Fig. 5 shows a coupling circuit $4a$ consisting of a transformer, which may be substituted for the coupling circuit 4 in Fig. 4, without changing the capacitive character of the load impedance Z, provided that the leakage inductance of the transformer does not more than wipe out the secondary capacity.

Fig. 6 shows a coupling circuit 9 which may be substituted for the coupling circuit 4 in Fig. 4 without changing the capacitive character of the load impedance Z, the plate potential for tube 1 being then supplied through a choke coil 10 instead of through resistances R and 5 as in Fig. 4. The circuit $4b$ consists of grid leak resistance 6 and stopping condensers 7 and 8. Over the frequency range to be transmitted by the amplifier, the inductance of coil 10 should be sufficiently high to prevent it from neutralizing the effect of the input capacity of tube 2 in rendering the load on the tube 1 capacitive.

Fig. 7 shows a coupling circuit $9a$ which may be substituted for the coupling circuit 9 in Fig. 6 without changing the capacitive character of the load impedance Z. Circuit $9a$ consists of the stopping condensers 7 and 8 and a tuned circuit 11. As indicated by Fig. 8, circuit 11 is tuned to be resonant or have zero reactance at a frequency F′ somewhat below the frequency F which is to be transmitted from tube 1 to tube 2, so that at the latter frequency the impedance of the circuit 11 is capacitive.

For causing the amplifier to operate as a volume expander, the circuit $9a$ of Fig. 7 can be adjusted to make the load impedance Z inductive, instead of capacitive. This can be done by tuning the circuit 11 to be resonant or have zero reactance at a frequency somewhat above the frequency F which is to be transmitted from tube 1 to tube 2, so that at the latter frequency the impedance of the circuit 11 is inductive. Other forms of inductive loads will be apparent to those skilled in the art.

What is claimed is:

1. The method of stabilizing the amplitude of variations in the output circuit of an electric space discharge amplifier circuit under changing conditions of amplitude of variations in the input circuit of the amplifier, which comprises effectively changing the input resistance in the input circuit in accordance with changes of the anode-cathode space discharge path resistance of the amplifier.

2. The method of operating an electric space discharge device which comprises varying the amplitude of variations in the input circuit of the device above and below a given value and effectively introducing positive resistance and negative resistance in the input circuit in response to said increase and said decrease, respectively.

3. The method of operating an electric space discharge device which comprises neutralizing coupling effects of inter-electrode capacity in the device by impedance balance, increasing and decreasing the amplitude of electrical variations in the input circuit of the device above and below a given value, and so disturbing the balance condition in response to said increase and said decrease as to effectively introduce positive and negative resistances, respectively, in the input circuit.

4. The method of operating an electric space discharge device which comprises neutralizing capacity effects of inter-electrode capacity in said device by impedance balance dependent upon the resistance of the anode-cathode space discharge path of the device, causing increase and decrease in amplitude of electrical variations in the input circuit of the device above and below a given value, and so changing the resistance of the discharge path in response to said increase and said decrease as to effectively introduce positive and negative resistances, respectively, in the input circuit.

5. A Wheatstone bridge comprising two substantially purely capacitive arms, two arms of substantially pure resistance impedance, two diagonals, and an electric space discharge device having its anode-cathode space discharge path in one of said arms.

6. A Wheatstone bridge comprising two adjacent arms having their impedances substantially pure resistances, two arms of substantially pure capacity adjacent said first two arms, respectively, and an electric space discharge amplifying device having its anode-cathode space discharge path in one of said arms, the impedance seen looking from said first two arms into opposite corners of said bridge being capacitive.

7. A Wheatstone bridge comprising two diagonals, a source of electrical variations in one of said diagonals, a work circuit in the other diagonal, and means including an electric space discharge device coupling the diagonals, the impedances in said work circuit and said means having such values that for a given amplitude of said electrical variations said bridge is balanced, and for greater and smaller amplitudes the bridge is unbalanced in such manner that resistances are effectively introduced in the input circuit of the device as a result of the unbalance that are positive and negative, respectively.

8. A Wheatstone bridge comprising four arms and two diagonals, an electric space discharge amplifier having an anode, a cathode and a discharge control element and having its space discharge path in one of said arms, a resistance in an arm adjacent said first arm, a capacity in each of said other arms, an input circuit for said amplifier in one of said diagonals, a capacitive work circuit for said amplifier in said other diagonal, and a source of electrical variations in said input circuit, the impedances of said arms and the operating conditions of said control element being so adjusted that when the amplitude of said input variations exceeds and falls below a given value, the Wheatstone bridge becomes unbalanced in such manner that a positive resistance and a negative resistance, respectively, are in effect introduced in said input circuit.

9. The method of operating an electric space discharge device which comprises neutralizing coupling effects of inter-electrode capacity in the device by impedance balance, increasing and decreasing the amplitude of electrical variations in the input circuit of the device above and below a given value, and so disturbing the balance condition in response to said increase and said decrease as to effectively introduce resistances of opposite signs, respectively, in the input circuit.

10. The method of operating an electric space discharge device which comprises neutralizing capacity effects of inter-electrode capacity in said device by impedance balance dependent upon the resistance of the anode-cathode space discharge path of the device, causing increase and decrease in amplitude of electrical variations in the input circuit of the device above and below a given value, and so changing the resistance of the discharge path in response to said increase and said decrease as to effectively introduce resistances of opposite signs, respectively, in the input circuit.

11. A Wheatstone bridge comprising four arms and two diagonals, an electric space discharge amplifier having an anode, a cathode and a discharge control element and having its space discharge path in one of said arms, a resistance in an arm adjacent said first arm, a capacity in each of said other arms, an input circuit for said amplifier in one of said diagonals, an inductive work circuit for said amplifier in said other diagonal, and a source of electrical variations in said input circuit, the impedances of said arms and the operating conditions of said control element being so adjusted that when the amplitude of said input variations exceeds and falls below a given value, the Wheatstone bridge becomes unbalanced in such manner that a negative resistance and a positive resistance, respectively, are in effect introduced in said input circuit.

12. The method of operating an electric space discharge device, which comprises causing amplitude variations from a given value in waves applied to the input circuit of said device, producing a variable negative resistance in the device in response to said amplitude variations, and varying the voltage applied to the input terminals of the device in response to said resistance variation.

13. The method of controlling the volume range of transmission through an electric space discharge device, which comprises varying from a given value the volume range appearing at the input circuit of the device, creating negative resistance varying in accordance with said range variations and varying the volume range appearing at the input terminals of the device in response to said resistance variations.

In witness whereof, I hereunto subscribe by name this 27th day of February, 1929.

EUGENE PETERSON.